United States Patent [19]

Schultz et al.

[11] 4,084,307
[45] Apr. 18, 1978

[54] METHOD OF JOINING TWO CABLES WITH AN INSULATION OF CROSS-LINKED POLYETHYLENE OR ANOTHER CROSS LINKED LINEAR POLYMER

[75] Inventors: Göran Schultz, Sundsvall; Karl-Gunnar Wiberg, Stockholm, both of Sweden

[73] Assignee: Allmanna Svenska Elektriska Aktiebolaget, Vasteras, Sweden

[21] Appl. No.: 740,969

[22] Filed: Nov. 11, 1976

Related U.S. Application Data

[63] Continuation of Ser. No. 482,850, Jun. 25, 1974, abandoned.

[30] Foreign Application Priority Data

Jul. 11, 1973 Sweden .............................. 7309706

[51] Int. Cl.[2] .......................... B29C 27/26; H01R 5/00;
[52] U.S. Cl. .............................................. 29/460; 29/628;
156/49; 219/10.61 R; 219/117.1; 264/93;
264/236; 264/248; 264/272; 264/319;
264/347; 264/342 R
[58] Field of Search .............................. 156/49, 53, 56,
84–86, 185, 187, 188, 189, 194–196, 213, 306;
264/36, 85, 93, 248, 263, 272, 236, 285,
294, 296, 313, 314, 316, 320, 322, 319,
331, 342 R, 347, 339, DIG. 46; 29/628,
460; 219/117 R, 10.61

[56] References Cited

U.S. PATENT DOCUMENTS

| 2,919,474 | 1/1960 | Cole .................................. 526/22 |
| 3,467,561 | 9/1969 | Waride ............................... 156/86 |
| 3,635,621 | 1/1972 | Miyauchi et al. .................. 264/174 |
| 3,777,048 | 12/1973 | Traut ................................. 156/49 |
| 3,846,528 | 11/1974 | Chrisman et al. .................. 264/347 |

FOREIGN PATENT DOCUMENTS 1,105,024  4/1961  Germany.

*Primary Examiner*—Willard E. Hoag
*Attorney, Agent, or Firm*—Watson, Cole, Grindle & Watson

[57] ABSTRACT

For joining two cables which have an insulation of a cross-linked linear polymer such as polyethylene, the insulation on each of the two ends to be connected is tapered, the ends of the conductors are then secured to each other, and the joint is wrapped with a tape of the same linear polymer containing a cross-linking agent. The wrapping is enclosed in a tube of relatively rigid material, which is then enclosed in a tube of flexible material. The joint is then enclosed in a casing and simultaneously subjected to heating by an electric heating arrangement and to all-sided pressure exerted by a fluid, which may be a gas or a liquid such as silicone oil.

6 Claims, 2 Drawing Figures

METHOD OF JOINING TWO CABLES WITH AN INSULATION OF CROSS-LINKED POLYETHYLENE OR ANOTHER CROSS LINKED LINEAR POLYMER

This is a continuation of application Ser. No. 482,850 filed Jun 25, 1974 now abandoned.

BACKGROUND OF THE INVENTION

1. Field of the Invention

The invention relates to a method of joining two cables with an insulation of cross-linked polyethylene or another cross-linked linear polymer.

2. The Prior Art

When joining two cables which have an insulation of cross-linked polyethylene, the insulation is initially removed nearest to the ends of the cables which are to be joined, usually in a fashion such that the insulation, located nearest the ends is bevelled in the direction of the ends. Then, before joining the ends together, usually achieved by welding or soldering, a semiconducting layer is applied around the joint (at least in the case of a high-voltage cable), and the joint, is normally insulated by wrapping the area around the exposed cable conductors and those parts of the conductor insulation which are located nearest the conductor ends with several layers of an unvulcanized polyethylene tape containing a cross-linking agent, for example di-α-kumyl peroxide or di-tert. butyl peroxide. The taped and joined cable is then placed with the wrapping in a tool where the wrapping is subjected to such a pressure and such a temperature that the layers of the tape melt together to form a cross-linked homogeneous compound. The tool used consists in the known embodiment of two tool halves which are each provided with a semicylindrical recess and which are movable towards each other. The tool halves contain built-in heating coils for heating them. At least if the cable is a high-voltage cable, a semiconducting layer is applied onto the insulation at the joint either after or in connection with the formation of this insulation. The same method can be used when joining cables which have insulation which consists of a cross-linked linear polymer other than polyethylene. In such cases the same linear polymer is normally used in unvulcanized form in the tape.

It has been found that when manufacturing the insulation at the joint in this manner, an insulation is obtained which does not possess uniform properties in the whole cross-section. Void formations will occur in the polyethylene material or in the material of other linear polymers, as well as flows of the polyethylene or of other linear polymers, and this may cause a deformation of the insulation at the joint so that the intended final shape is not obtained.

SUMMARY OF THE INVENTION

The disadvantages described above can be avoided according to the present invention. According to the invention, an all-sided pressure is applied on the wrapping of the tape of polyethylene (or of other linear polymer) with a gas or a liquid. In this way a radially-directed pressure on the wrapping is obtained around its whole periphery, as opposed to the known procedure wherein pressure is effected from two opposite directions only.

According to a preferred embodiment of the invention, the pressure on the wrapping is effected with a gas which is supplied to a pressure vessel arranged around the wrapping and the heating is effected with a heating element, for example, by means of a metal net which is arranged on the wrapping in the pressure vessel. The wrapping is surrounded with a casing, preferably of a plastic or an elastomer, for example silicon rubber, sealing against the gas. The sealing casing may consist of a separate element in relation to the heating element, in which case it is preferably arranged inside the heating element. The sealing casing may also be an element combined with the heating element. The heating element can in this case be arranged within the sealing casing by incorporating conducting particles such as carbon particles in the sealing casing. Irrespective of in which way the sealing casing and the heating element are arranged around the wraping, it is advantageous to arrange, in the area nearest the wrapping, a relatively rigid casing, for example of metal sheet such as brass sheet, for such a casing is able to shape the wrapping into a substantially cylindrical shape during the heating. This is important since otherwise difficulties will arise with regard to obtaining an insulation at the joint having the same shape as the normal insulation of the cable. A metal sheet used in the way mentioned also contributes to achieving a more even distribution of temperature around the wrapping. A great advantage with achieving the pressure by means of gas and performing the heating in the manner described is that a high temperature gradient is obtained directed from the insulation at the joint towards the original insulation of the cables, so that the risk of already effecting the latter during the heat treatment is very small. Another advantage is the small power consumption for heating the wrapping.

According to another advantageous embodiment of the invention, the pressure on the wrapping is effected with a liquid, for example silicone oil, which is supplied to a pressure vessel arranged around the wrapping, and the heating with a heating device arranged on the outside of the pressure vessel. It is also possible to arrange the heating device in the pressure vessel, but having it on the outside involves some practical advantages. Among other things, there will be no problems with the sealing. The wrapping is surrounded with a casing sealing against the liquid preferably of a plastic or an elastomer, such as silicone rubber. Particularly preferred is a sealing casing in the form of a shrinkage tube which is shrunk onto the wrapping.

BRIEF DESCRIPTION OF THE DRAWINGS

The invention will be understood more easily by way of example with reference to the accompanying drawing, in which FIG. 1 schematically illustrates the joining process with the use of gas as pressure medium and FIG. 2 schematically the joining with the use of a liquid as pressure medium.

DESCRIPTION OF THE PREFERRED EMBODIMENTS

Figure 1:
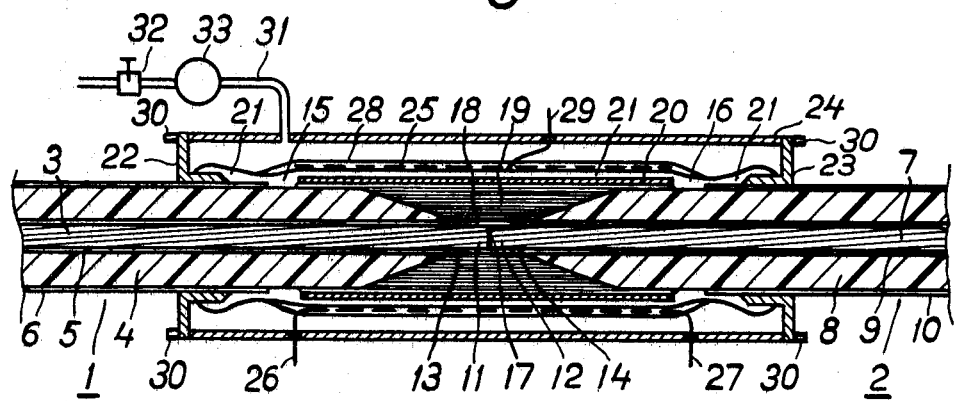

FIG. 1 shows two cables 1 and 2 which are to be joined. The conductor of the cable 1 is designated 3 and its insulation, which consists of cross-linked polyethylene, is designated 4. Te cable 1 has an inner semiconducting layer 5 and an outer semiconducting layer 6. The conductor of cable 2 is designated 7 and its insulation, which also consists of cross-linked polyethylene, is designated 8. The cable 2 has an inner semiconducting layer 9 and an outer semiconducting layer 10. The semiconducting layers 5, 6, 9 and 10 can be applied by spraying on semiconducting polymer, for example a copolymerizate of ethylene and ethyl acrylate containing conducting carbon black. Each cable has an exposed part 11 and 12, respectively. As appears from FIG. 1, the insulations of the cables are bevelled in the direction of the conductor ends into a conical shape. The inner semiconducting layers 5 and 9 extend a short distance 13 and 14, respectively, beyond the top of the respective cone. The outer semiconducting layers are removed at some distance 15 and 16, respectively, from the base of the respective cone. When joining the cables, the conductor ends are joined to each other, for example, by welding or soldering, so that a joint 17 is obtained. Over the exposed conductors there is applied a semiconducting layer 18, which makes contact with the semiconducting layers 5 and 9 at the projecting pieces 13 and 14. The layer 18 can be achieved with a tape of unvulcanized polyethylene containing a cross-linking agent, for example di-α-kumyl peroxide or di-tert.butyl peroxide and conducting carbon black by winding the tape around the conductors. The area around the exposed conductors 11 and 12 with the aplied semiconducting layer 18 and the parts of the insulations 4 and 8 located nearest to this area are then wrapped with a tape of unvulcanized polyethylene containing a cross-linking agent, for example di-α-kumyl peroxide or di-tert. butyl peroxide so that a compact wrapping 19 is obtained. Immediately outside the wrapping a relatively rigid casing for the wrapping is applied in the form of brass sheet 20, the object of which is to support the material in the wrapping during the subsequent heating so that it retains its cylindrical shape. The brass sheet also contributes to achieving an even distribution of the temperature around the wrapping. The brass sheet is surrounded by a sealing casing 21 which also acts as a seal against the end sleeves 22 and 23, which constitute end pieces in the pressure vessel, the remaining elongated portion 24 of which is applied later on. The sealing casing 21 is formed of an unvulcanized silicone rubber tape which is wound on so as to be overlapping and thereafter cross-linked. Outside the sealing casing there is arranged a heating element 25 whose connecting conductors for electric current are designated 26 and 27. The heating element consists in the exemplified case of a high-resistance net, for example a net of resistance wire. In either end of the cylindrical net and in contact with the respective connecting conductor there is arranged a peripherally running copper wire, so that the current becomes uniformly distributed along the heating element. Outside the heating element there is another layer 28 of silicone rubber which is cross-linked on the spot. A thermocouple 29 is arranged in the casing 21, which makes it possible to measure and maintain the proper temperature during the heating of the wrapping 19. The part 24 which, for example may be cylindrical or parallelepipedic is then put in its place. This is possible as it is divided into two parts. The two parts are fastened at the end sleeves 22 and 23 by fastening screws 30.

Air is supplied to the pressure vessel through the line 31 with he valve 32 and the pressure gauge 33 and the connecting conductors 26 and 27 of the heating element are connected to a current source. In this way such pressure and such a temperature can be applied to the wrapping for several hours that it melts together to form a cross-linked, homogeneous compound, which forms continuous transitions with the insulatons 4 and 8 and which has the same appearance and properties as the material in these. The polyethylene in the semiconducting layer 18 is cross-linked at the same time. When the vulcanization is finished, the pressure vessel and the parts 28, 25, 21 and 20 are removed and any polyethylene at the joint of the manufactured insulation which extends outside the insulations 4 and 8 are scraped off. An outer semiconducting layer (not shown) is then applied to the manufactured insulation, this layer connecting the semiconducting layers 6 and 10. This can be achieved for example, by painting the insulated joint with a colloidal aqueous solution of graphite. It can also be achieved in the same way as the inner semiconducting layer 18 by applying a polyethylene tape containing conducting carbon black around the wrapping 19 and vulcanizing it together with this.

Figure 2:
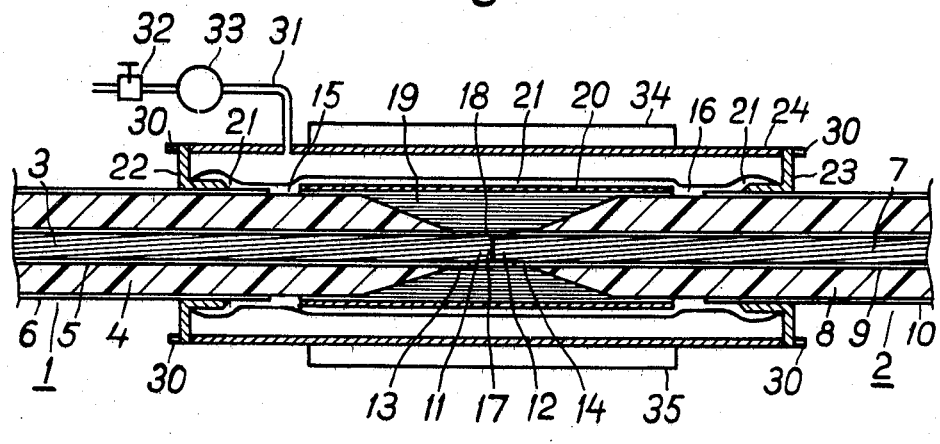

In the means according to FIG. 2, the designations from FIG. 1 have been retained for the parts which correspond to each other. In this case the sealing casing 21 around the wrapping suitably consists of a shrinkage tube of silicone rubber which is shrunk onto the underlying material by heating, for example, with a heating lamp. With a shrinkage tube a casing is easily obtained without causing formation of wrinkles. In this case the heating is performed by means of one or more heating plates 34 and 35 arranged on the outside of the pressure vessel. One example of a suitable pressure liquid to be supplied through the line 31 is silicone oil.

When joining multi-conductor cables, each separate cable part can be joined and provided with insulation in the manner described. It is of course also possible to construct the pressure vessel so that several cable parts can be placed in it and the same body of gas or liquid be used for simultaneous joining of all parts. Thus, for joining of a three-conductor cable, for example, each one of the end sleeves 22 and 23 can be provided with three holes for leading the three parts through them. Each part is provided with a wrapping according to FIGS. 1 and 2 and the gas or liquid is common for all vulcanization processes which then take place simultaneously.

When the joining and the insulation of the joint with applied semiconducting layers is finished, the cable is provided with a metallic screen and a shell in the normal way at the joint.

The invention has been described in detail with cross-linked polyethylene as insulation in the cable parts and with unvulcanized polyethylene containing cross-linking agent as the material in the tape for the wrapping at the joint. However, the invention is also applicable to cables with insulations of other cross-linked linear polymers than polyethylene, for example copolymers of ethylene and propylene, copolymers of ethylene and propylene with dienmonomers such as dicyclopentadien or 1,4-hexadien or a mixture of polyethylene with any of the noted copolymers. The linear polymers can thus be unbranched or branched. In unvulcanized form the exemplified materials are also usable as materials in the tape in the wrapping around the joint. If the insulation around the joint is to be of the same type as the original insulation of the cable, which is normally desirable, the same polymer is used in unvulcanized form in the tape as the one which in cross-linked form forms the insulation of the cable. However, it is also possible to use another polymer in the tape than the one of which the cable insulation is composed.

We claim:

1. The method of forming a splice between two electrical conductors having a cross-linked polymer insulation, comprising: removing the insulation from said conductors adjacent the ends thereof to be joined so as to leave the end portions of said conductors bare, joining the bare ends of said conductors, wrapping the joined ends of said conductors and portions of insulation adjacent said joined ends with plural layers of a cross-linkable linear polymer tape containing a cross-linking agent for said polymer, forming a tape-wrapped joint, disposing a heating means about and in thermally conducting solid contact with said tape-wrapped joint, disposing a pressure envelope about said tape-wrapped joint and said heating means so as to encompass said heating means therewithin, heating said tape-wrapped joint by said heating means and supplying gas having a pressure above atmospheric pressure to said pressure envelope so as to concurrently compress said tape-wrapped joint and melt said layers together and cross-link said polymer.

2. The method of claim 1, which includes disposing a sheet material about said tape-wrapped joint to form said tape-wrapped joint into a substantially cylindrical shape during said compressing and heating steps.

3. The method of claim 1 wherein said casing is made of a material selected from the group consisting of plastics and elastomers.

4. The method of claim 1 wherein said polymer is cross-linkable polyethylene.

5. The method of claim 1 which includes surrounding said tape-wrapped joint with a sealing casing prior to heating said tape-wrapped joint and prior to supplying gas to said pressure envelope to protect said tape from contact with the compressing gas.

6. The method of claim 5 wherein said surrounding step includes heat shrinking a heat-shrinkable polymer layer about said tape-wrapped joint.

* * * * *